Dec. 13, 1938.  J. H. O'NEIL  2,140,246
APPARATUS FOR ALIGNING THE SIDE SEAMS OF TRAVELING CAN BODIES
Filed Nov. 8, 1937
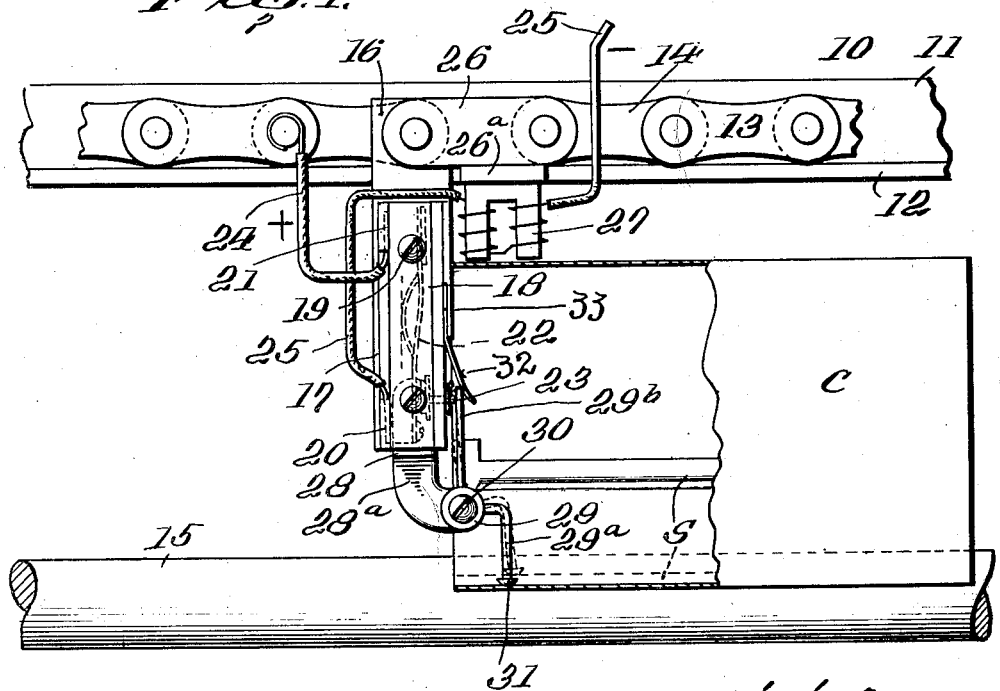
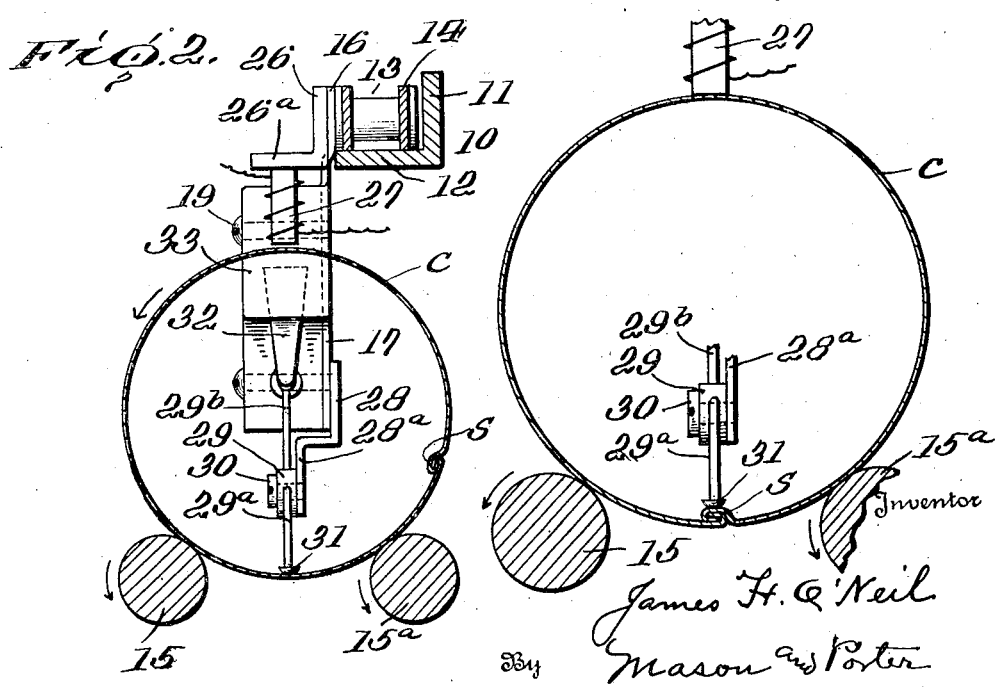

Patented Dec. 13, 1938

2,140,246

UNITED STATES PATENT OFFICE 2,140,246

APPARATUS FOR ALIGNING THE SIDE SEAMS OF TRAVELING CAN BODIES

James H. O'Neil, Syracuse, N. Y., assignor to Continental Can Company, Inc., New York, N. Y., a corporation of New York Application November 8, 1937, Serial No. 173,476

4 Claims. (Cl. 198—33)

In the manufacture of sheet metal can bodies, it is often necessary to convey the can body in an endwise direction with the side seams of the can bodies in alignment and in a predetermined line of travel relative to the machines operating thereon. It is a common practice to associate the soldering mechanism which solder bonds the side seam so closely with the body maker that the can bodies after the side seams are formed are moved in an endwise direction by a conveying mechanism which holds the side seams in alignment and presents the same in a proper line of travel to the solder applying mechanism. When the can bodies leave the solder applying mechanism, they are moved forward in an endwise direction in a continuous line, but no effort is made to maintain alignment of the side seams or to cause the same to travel in any predetermined line of travel.

An object of the invention is to provide an apparatus which is adapted to receive can bodies traveling in an endwise direction, with the side seams out of alignment, which apparatus includes means for rotating the can bodies and aligning the side seams for travel in a predetermined line.

A further object of the invention is to provide an apparatus of the above type with means for holding the can bodies with the side seams moving in a predetermined line of travel.

A still further object of the invention is to provide an apparatus of the above type wherein the side seams are aligned and held in a predetermined line of travel while said can bodies are in continuous forward endwise movement.

These and other objects will in part be obvious and will in part be hereinafter more fully disclosed.

In the accompanying drawing—

Figure 1 is a fragmentary side elevation, with the can body shown partly in section, illustrating one form of apparatus for conveying the can bodies and aligning the side seams thereof;

Fig. 2 is an end view in section, taken substantially at right angles to the path of travel of the cans, and Fig. 3 is an enlarged fragmentary end view, similar to Fig. 2, showing the position of the can body after the side seam thereof has reached its predetermined position of alignment.

The invention is directed to an apparatus which is adapted to receive can bodies moving in an endwise direction, with the side seams out of alignment or in alignment, but in no particular line of travel, which apparatus includes means for rotating the can bodies while they are traveling, and means for stopping the rotation of the can body when the side seams reach a predetermined line of travel. This is preferably accomplished by two parallel rotating rollers with which the can bodies make frictional contact so that as the can bodies move along the rollers in their endwise travel, they are also rotated. The length of the rollers is such that each can body will be given, at least, one complete rotation while it is in contact with the rollers. Associated with the rollers and traveling with the can bodies is a means which is adapted to stop the rotation of the can body when the side seams reach a predetermined line of travel. This means preferably includes a lever which contacts with the side seam when it reaches a predetermined line of travel and the lever operates a switch controlling an electro-magnet which, when energized, stops the rotation of the can body. This magnet travels with the can body so that it is held with the side seam in a predetermined line of travel and delivered from the rollers, preferably to a conveying mechanism which will maintain the alignment of the side seams.

Referring in detail to the illustrated embodiment of the invention, a pair of rollers 15 and 15a are suitably mounted so that the can bodies in their endwise travel will rest on the rollers and move along the same. Suitable means is provided for rotating the rollers. Both rollers rotate in the same direction and the can bodies resting thereon will make sufficient frictional contact with the rollers, so that when each can body comes in contact with the rollers, it will be slowly rotated. The length of the rollers is such that the can bodies will be each given a little more than one complete rotation, unless stopped by some other means. The means for delivering the can bodies on to these rollers and for removing the same therefrom may be of any suitable construction, and it is not thought necessary to illustrate the same. Neither is it thought necessary to illustrate the means for supporting and rotating the rollers.

Associated with the rollers is a supporting angle rail 10. Said rail has a vertical portion 11 and a horizontal portion 12, which serve to form a trackway for an endless conveyor chain 13. The endless chain 13 is of conventional form, and consists of a plurality of pivotally connected links 14. The rail 10 serves to support the lower flight of the endless chain 13, and this rail is so disposed that the chain moves in a path parallel with the axes of the rollers 15 and 15a. The rail is set, as shown in Fig. 2, so that it is located substantially directly above the roller 15a and at a distance slightly greater than the diameter of the can body.

Mounted on this conveyor chain at properly spaced intervals is a means for pushing the can bodies along the rollers. This conveying means is in the form of a depending bracket 17. The forward face of the bracket contacts with the end of the can body and moves the can body along the rollers. The contact between the bracket and the can body is, therefore, such that the can body can be rotated through the frictional contact of the can body with the rotating rollers.

This depending bracket is mounted for travel in a vertical plane passing centrally through the can body and midway between the supporting rollers 15 and 15a. The bracket is provided with a means for stopping the rotation of the can body when the side seam thereof reaches a predetermined line of travel. This means for stopping the can body, as illustrated, consists of a magnet 27 having field coils and a circuit for energizing the field coils which includes a switch that is operated by a lever contacting with the side seam when said side seam reaches a predetermined line of travel. The switch is indicated at 18. The switch is secured to the depending bracket 17 by screws 19 or the like. This switch is a highly sensitive switch of the Burgess microtype. It includes a pair of terminals 20, 21, and a spring arm 22 by which connection is effected between the terminals. The spring arm 22 tends to remain normally out of contact with the terminal 21, and a plunger 23 serves as a means for forcing the spring arm 22 into contact with the terminal 21. The terminal 21 of the switch is connected by a wire 24 to the chain 13 for grounding, and the terminal 20 is connected by a wire 25 to a trolley feed wire, not shown.

Mounted at the lower end of the bracket 17 is a depending arm 28 having an inwardly offset portion 28a. A double arm lever 29 is pivotally mounted on a pivot pin 30 carried at the lower end of this offset portion 28a. The lower end of the lever arm 29a terminates in an enlarged head 31 which is rounded on its lower face. The upper end 29b of the lever arm 29 is disposed adjacent the plunger 23 and is maintained in contact therewith by a leaf spring 32. The leaf spring is clamped between the extension 33 on the bracket 17 and the switch housing 18. This spring 32 is so shaped and tensioned as to maintain the arm 29a in a vertical position while permitting the spring arm 22 to remain out of contact with the terminal 21.

The depending bracket 17 is carried by a plate 16 attached to one of the links of the conveyor chain 13, and also attached to this plate 16 is an angle bracket 26 having a laterally extending portion 26a at its lower end. Mounted on this portion 26a is the electro-magnet 27 including a pair of cores which depend therefrom and lie close to the path of travel of the outside upper portion of the can body. The wire 25 is coiled around the cores for energizing the same when the switch is closed.

The can bodies are discharged on to the rollers 15 and 15a and are engaged one after another by a depending bracket 17 which pushes the can body along the rollers. These rollers, as noted above, are turning comparatively slowly and they make frictional contact with the can body so that it will rotate each can body and give thereto, at least, a complete rotation while the can body is in contact with the rollers, unless stopped by some other means. The bracket contacting with the end of the can body permits this rotation of the can body. In the drawing, a can body is indicated at C and the side seam at S. This side seam is of the usual lock seam type with the metal parts folded so as to lie on the inside of the can body. This forms a projecting rib which extends the full length of the side seam. The head 31 of the control lever 29 is positioned in the desired line of travel of the side seams of the can bodies. It is understood that there is a depending bracket for pushing each can body and a control lever and a magnet associated with each bracket. The rounded end of the lever, when said lever hangs in its normal vertical position, is out of contact with the wall of the can body, but it lies so close to the wall of the can body that the side seam, if it is brought into contact with the rounded end of the lever, will raise the rounded end and swing the lever, as shown in Fig. 3, and move the same to the dotted line position shown in Fig. 1. This causes the switch to be closed and the magnet to be energized. In Fig. 2, a can body is shown as located on the rollers 15 and 15a with the side seam at one side of the desired line of travel for the side seam. As the rollers rotate in the direction of the arrow shown, the can body will rotate in a counterclockwise direction, as indicated by the arrow applied thereto. This will cause the side seam to move underneath the rounded head 31 and raise the rounded head to the position shown in Fig. 3. As noted above, this raising of the rounded head 31 closes the switch and energizes the magnet which will stop the can body from rotating and hold the can body with the side seam in the predetermined line desired. The rollers will slide on the can body when it is held from rotation by the magnet. Thus it is that the side seams of the can bodies, regardless of how they may be positioned when they contact with the rollers, will be moved into a predetermined line of travel and stop their rotation when the can bodies reach this predetermined line of travel, and they will be held firmly in this position of travel by the magnets until they pass off from the rollers and are delivered to a conveying means for conveying the can bodies with the side seams aligned to any desired mechanism for operating on the same.

It will be understood that the control lever 29 is held by the leaf spring 32 in its normal vertical position, so that if for any reason the can body strikes the lower end of the lever, the lever can yield to permit the can body to pass underneath the same and it will quickly return to its normal position and remain in such position until the side seam contacting therewith lifts the lever and energizes the magnet and thus the side seam is held to a predetermined line of travel until it is delivered from this aligning apparatus.

It is obvious that other mechanism may be provided for rotating the can body and for stopping the can body with the side seams in a predetermined line of travel. It is essential, however, that some means shall be provided which operates upon the can body while it is traveling for rotating the same so as to provide the necessary re-positioning of the side seams to bring them into alignment. It is also necessary to provide some means which will stop the can body regardless of the extent of its rotation when the side seam reaches a predetermined line of travel. Many changes in the details of construction and the arrangement of the parts may be made, therefore, without departing from the spirit of the invention as set forth in the appended claims.

Having thus described the invention, what I claim as new and desire to secure by Letters Patent, is:

1. An apparatus for arranging the side seams of can bodies in a predetermined line of travel comprising means for conveying the can bodies in succession in an endwise direction, parallel spaced rotating rollers for supporting the can bodies and along which they are moved by the conveying means whereby the can bodies are rotated during their travel, and magnetic means traveling with the can bodies for stopping the rotation of the can bodies when the side seams thereof reach a predetermined line of travel and for maintaining said side seams in such alignment.

2. An apparatus for arranging the side seams of can bodies in a predetermined line of travel comprising means for conveying the can bodies in succession in an endwise direction, means for rotating the can bodies, magnetic means movable with said conveying means for stopping the rotation of the can bodies, and means contacting with the side seams when said side seams reach a predetermined line of travel for energizing said magnet to stop the rotation of the can body and for maintaining said side seams in alignment.

3. An apparatus for arranging the side seams of can bodies in a predetermined line of travel comprising means for conveying the can bodies in succession in an endwise direction, rotating rollers extending parallel with the direction of travel of the can bodies for supporting and rotating the can bodies during their travel, said conveying means including a depending member contacting with the can body and pushing the same along the rollers, a magnet associated with said depending member and located close to the path of rotation of the can body, means for energizing said magnet including a switch, and a control lever operated by contact with the side seam when it reaches a predetermined line of travel for closing the switch and energizing the magnet to stop the rotation of the can body and maintain the side seams in alignment.

4. An apparatus for arranging the side seams of can bodies in a predetermined line of travel comprising means for conveying the can bodies in succession in an endwise direction, rotating rollers extending in a direction parallel with the path of travel of the can body for supporting and rotating the can body in its travel, said conveying means including a depending member adapted to push the can body along the rollers, a control arm carried by said depending member which is normally out of contact with the wall of the can body and which is engaged and moved by the side seam when the side seam reaches a predetermined line of travel, a magnet disposed adjacent the can body, and means for energizing said magnet including a switch operated by said control lever whereby the rotation of the can body is stopped when the side seam reaches a predetermined line of travel and for maintaining said side seam in such alignment.

JAMES H. O'NEIL.